United States Patent [19]

Parker

[11] Patent Number: 4,535,024

[45] Date of Patent: Aug. 13, 1985

[54] GLOSS BLACK METALIZED PRODUCT AND METHOD OF PREPARATION

[75] Inventor: Harry A. Parker, Murray Hill, N.J.

[73] Assignee: Transfer Print Foils, Inc., East Brunswick, N.J.

[21] Appl. No.: 438,220

[22] Filed: Nov. 1, 1982

[51] Int. Cl.[3] ......................... B32B 3/00; B32B 15/08

[52] U.S. Cl. .................................... 428/200; 156/233; 427/250; 427/383.1; 428/31; 428/204; 428/205; 428/209; 428/343; 428/347; 428/457; 428/913; 428/914

[58] Field of Search ................. 428/457, 461, 343, 31, 428/914, 913, 425, 200, 204, 469, 205, 347, 201, 209; 427/248.1, 250, 162, 383.1; 528/49; 204/159.15, 159.14; 156/233

[56] References Cited

U.S. PATENT DOCUMENTS

| | | | |
|---|---|---|---|
| 3,677,792 | 7/1972 | Best | 427/248.1 |
| 3,953,635 | 4/1976 | Dunning | 428/200 X |
| 3,987,127 | 10/1976 | Dickie et al. | 204/159.15 X |
| 4,012,552 | 3/1977 | Watts | 428/200 |
| 4,101,698 | 7/1978 | Dunning et al. | 428/31 |
| 4,104,432 | 8/1978 | Manabe et al. | 428/461 X |
| 4,131,602 | 12/1978 | Hodakowski et al. | 528/49 |
| 4,131,716 | 12/1978 | Bertozzi | 428/425 |
| 4,146,452 | 3/1979 | Webber et al. | 204/159.14 |
| 4,250,209 | 2/1981 | deLeeuw et al. | 427/250 |
| 4,275,116 | 6/1981 | Kratschmer | 428/457 X |
| 4,330,352 | 5/1982 | Grimes et al. | 428/914 X |
| 4,349,402 | 9/1982 | Parker | 427/250 X |
| 4,430,366 | 2/1984 | Crawford et al. | 427/162 |

*Primary Examiner*—Thomas J. Herbert

*Attorney, Agent, or Firm*—David Jackson; Daniel H. Bobis

[57] ABSTRACT

A glossy black reflective metal coating with improved durability is prepared as a film of an intrinsically blackened chromium-containing metal. A laminate may be prepared with the metal coating bonded to at least one transferable resin film. A particular laminate includes at least one top coat and at least one base coat, with the metal coating located in sandwich relationship therebetween.

8 Claims, No Drawings

GLOSS BLACK METALIZED PRODUCT AND METHOD OF PREPARATION

BACKGROUND OF THE INVENTION

1. Field of the Invention

The present invention relates to black reflective metal coatings, and to decorative products including laminates, having such coatings as part thereof.

2. Description of the Prior Art

Recent changes in the construction and the appearance of automobiles due in part to the increase in cost of automotive metals, has encouraged efforts to develop and employ synthetic resin materials, as metal substitutes where possible. For example, numerous metalized resin parts have been adopted as replacements for conventional chromium plate in external trim work, bumpers and the like, to reduce vehicle weight, and to reduce the cost of manufacture and operation of the automobile.

Recently, exterior trim work has made broad use of glossy black coloration in place of the standard chrome-plated appearance. Specific parts have been prepared with the objective of presenting a glossy black appearance, however having the reflectance of chromium. This product has been appropriately nicknamed "black chrome" as it seeks to combine the black pigmentation with the reflective metallic properties of chromium plate.

So far as is known, the preparation of parts with the "black chrome" finish has involved the direct application of various coating systems involving either composite paints, or sequential coatings of reflective material and translucent paints, to achieve the black reflective effect. For example, the formed part may be metalized in accordance with conventional commercial procedures, and thereafter coated with a black paint that offers a translucent appearance permitti.ng the underlying reflective metal layer to be visible. This effect may be achieved either by the application of an extremely thin black paint, or the preparation of a paint containing a reduced quantity of pigment loading based on resin solids.

An alternate approach has been to include the reflective material within the paint formulation, by the inclusion of micron sized metal particles in a uniform, almost colloidal suspension in combination with pigment particles of comparable size. In such instance, the formed part would receive a succession of thin coatings of this specially formulated paint for the purpose of achieving the combination of black color and reflectance.

The products prepared by the described techniques possess certain drawbacks, among them an undesirably short useful life. Many of the products prepared with the "black chrome" finish are utilized in external applications where adverse mechanical and environmental conditions promote deterioration. The paints frequently break down, fade and otherwise discolor after extended exposure to sunlight, and frequently fracture upon mechanical impact, even in the instance where purportedly protective top coats are applied. The paints themselves frequently exhibit poor uniformity between batches, with the result that the finished products may vary in hue, reflectance, etc.

The prior art products possess a further drawback, in that the specialized nature of the coatings applied to create the "black chrome" effect, must be individually and directly applied to the formed products. The individual coating of respective parts after their formation, demands greater time and facilities, that contributes to an undesirable increase in manufacturing cost.

A need therefore exists for the development of a black reflective product that is capable of low cost manufacture, such as by hot transfer lamination, and exhibits improved mechanical strength and resistance to environmental deterioration lacking in the prior art products.

SUMMARY OF THE INVENTION

In accordance with the present invention, a glossy black reflective metal coating having improved durability and resistance to environmental deterioration is prepared. The reflective metal coating comprises a film of an intrinsically blackened chromium-containing metal. The present metal coating is prepared by heating the chromium-containing metal to a temperature above its boiling point and vapor depositing a quantity of the metal on a receptive surface. Preferably, the chromium containing metal is a nickel-chromium alloy.

A decorative laminate product is also included, which comprises the metal coating of the invention bonded to at least one transferable resin film. The laminate may comprise at least one base film having the present metal coating disposed over one of its surfaces, and at least one top coat overlying the free surface of the metal coating, to form a sandwich-like structure. The top coat serves to protect the laminate from mechanical and environmental damage, and may include, for example, a clear top coat, and an intermediate coat lying between the top coat and the metal layer. The intermediate coat may contain one or more organic resins curable by ultraviolet light.

The base coat may include a tie coat adjacent the metal coat, to improve adhesion of the metal coat. A pigmented coat may in turn, be applied to the free surface of the tie coat, to enhance the opacity and color of the laminate, in the instance where a "black chrome" transfer is in preparation.

The present invention also includes the methods for preparing the metal coating, and the laminate that may include it. The metal coating may be prepared by heating a quantity of the chromium-containing metal to the temperature above its boiling point, and exposing the surface upon which the metal coating is to be formed, to the vapors of the chromium-containing metal, so that the metal vapors condense on the surface and form the metal coating. Various surfaces may be used for vapor deposition, and a number of surfaces are accordingly contemplated. The surface or substrate may be an organic resin film, and in particular a continuous strip. Thus, the chromium-containing metal may be heated in a vacuum chamber, and the continuous strip may be moved through the chamber, so that deposition of the metal vapor will occur uniformly along its length. The continuous strip may comprise a carrier film having one or more resin films previously coated thereon. Alternately, the carrier film may have a release coat only, in the instance where the metal coating is to be exposed. In either event, the carrier film is preferably maintained at a temperature below 32° F. during the deposition of the metal vapors.

The metal coating of the present invention may be applied in a variety of thicknesses depending upon the end use of the product. In the instance where a heat-transferable laminate useful for automotive applications is contemplated, an exemplary preparation utilizes the metal film in a thickness that offers a translucent visual appearance. Such thickness may range on the order, for example, of several Angstroms.

The laminates prepared in accordance with the present invention are useful in automotive applications, and may be prepared for hot transfer lamination to three dimensional formed products, such as bumper segments, trim strips, taillight enclosures and the like. In such instance, an adhesive coat suitable for hot transfer lamination may be applied over the exposed surface of the base coat.

The metal coating of the present invention and the corresponding laminate are not limited in their applications to automotive products, and can be utilized in all applications where a black reflective surface is desired.

Laminates prepared in accordance with the present invention exhibits substantially improved corrosion and water resistance, and resist deterioration from ultraviolet radiation and chemical attack from the environment. The products are also sufficiently strong to withstand fracture caused by mechanical impact. The black chromium coating offers brillance and reflectance that exceed the quality available with prior products of this type. Moreover, the ability to prepare hot transfer laminates having an improved black chromium coating, represents a significant savings in manufacturing cost.

Accordingly, it is principal object of the present invention to provide a glossy black reflective metal coating having improved durability, which is capable of preparation as a decorative metalized laminate.

It is a further object of the present invention to prepare a laminate having the glossy black reflective coating as aforesaid, which is adapted for hot transfer lamination.

It is a still further object of the present invention to provide methods for preparing the metal coating and a laminate containing the same, that may be simply and inexpensively practiced.

Other objects and advantages will become apparent to those skilled in the art from a review of the ensuing description.

DETAILED DESCRIPTION

In a first aspect, the present invention comprises the preparation of a glossy black reflective metal coating comprising an intrinsically blackened chromium-containing metal. When utilized in a laminate product as described later on herein, the chromium-containing metal coating is responsible for the unique reflective black appearance of the laminate. A variety of chromium-containing metals may be utilized, including alloys of chromium with nickel, iron, stainless steel, aluminum and others, as well as chromium individually. Preferably, a nickel chromium alloy is utilized and applied herein. The chromium-containing metal coating is preferably vapor deposited, and the metal is heated above its boiling point during vapor deposition.

Generally, metals applied as coatings by vapor deposition techniques, must be heated to their molten state and vaporized, to cause a uniform, thin layer of the metal to condense on the adjacent surface of the substrate being coated. The chromium-containing metals of the present invention tend to exhibit "outgassing" when heated to their boiling point for vapor deposition. One of the discoveries of the present invention is that these chromium-containing metals may be heated to temperatures above their boiling point, whereupon "outgassing" is enhanced and the deposited metal vapors assume a black appearance. The result of conducting vapor deposition at this higher metal temperature is that a black, highly reflective metallic layer or coating is prepared. As mentioned earlier, this coating is particularly desirable when applied to products having automotive applications.

Accordingly, the method for preparing the glossy black reflective metal coating comprises heating a quantity of a chromium-containing metal to a temperature above its boiling point and thereafter conducting a vapor deposition of such metal by exposing a surface or substrate to the vapors of the metal to permit condensation to occur. Preferably, the chromium containing metal comprises a nickel chromium alloy, which has a boiling point of approximately 5252° F. This alloy is heated in accordance herewith, to a temperature of 5400° F. and a vacuum deposition of the vaporized metal is thereafter conducted.

The surface upon which the chromium containing metal may be vapor deposited can naturally vary. In one embodiment, the surface may comprise an organic resin film, and more particularly a continuous strip of such film which is moved past the metal vapors for uniform correspondingly continuous metal deposit. Vapor deposition may take place in conventional apparatus and under conditions well known in the art. For example, deposition may be conducted a vacuum chamber, and a continuous strip of resin film may accordingly be moved through such chamber, with a surface thereof exposed to the metal vapors.

The continuous strip may comprise a carrier film, in the instance where a laminate is in preparation. The carrier film may be coated with one or more resin films which would thereafter serve as either top coats or base coats for a resulting laminate. The carrier may alternately be treated with an appropriate release coat, and thereafter vapor coated so that the resulting laminate will have an outer surface comprising the metal coating. The invention is not limited to specific resin coatings, their sequence of application or later utility, but is intended to encompass all variations within its scope.

In the instance where the metal coating method of the invention is practiced with a continuous carrier strip as described above, the carrier strip is preferably maintained at a temperature below the freezing point of water, i.e. below 32° F., while its passes over the metal vapors. This may be accomplished by passing the carrier strip or film over a chill roll at the point along its travel that is in the vicinity of the impinging metal vapors.

The chromium-containing metal coating of the present invention may be prepared to a variety of thicknesses, depending upon the intended use of the resulting product. In the instance, for example, where a heat transferable laminate is to be prepared, and a thin, translucent metal coat is desired, the carrier film bearing previously applied resin coats, described further on herein, is moved through the vacuum metalizing chamber at a speed of about 22′ per second. The opening in the chamber through which the metal vapors may escape to contact the carrier film, may be set to 18″, and the vacuum pressure in the chamber may be $10^{-6}$ torr. Also, the carrier strip may be maintained at a temperature of +10° F. by appropriate control of the chill roll. Naturally, the foregoing specific conditions are exemplary of a particular embodiment of the present invention, and are presented herein in fulfillment of disclosure of the best mode of practice of the invention.

As noted earlier herein the present invention is particularly well suited for the inexpensive preparation of laminate products useful in automotive applications. One of the advantages of the present invention is that it permits the preparation of heat transferable laminates that may be easily applied to three dimensional automotive products, either by being molded thereagainst, or applied to previously formed structures. The distinctive appearance of the present chromium-containing metal coating is an important feature that may be favorably incorporated in a variety of laminate constructions.

As is known in the art, transferable laminates may be prepared with a variety of materials and constructions, to suit various environments and applications. As mentioned earlier, a laminate comprising the metal coating of the present invention disposed on an appropriate base may be suited for certain interior applications, while a construction having a top coat and a base coat with the chromium-containing metal coating sandwiched in between, would be useful in exterior applications.

A variety of resin materials are suitable for use in the preparation of laminates in accordance with the present invention. Thus, among the organic resinous materials contemplated, a variety of thermoplastic and thermosetting materials may be utilized. In the instance where a heat transferable laminate is contemplated, numerous thermoplastic resins may be used, including vinyl polymers such as polyvinyl alcohol, polyvinyl acetate, polyvinyl chloride, polyvinyl fluoride; acrylic resins, including acrylic acid esters, their alkyl- and aryl-substituted homologs, polycarbonate resins, ABS resins and others.

In addition, certain of the contemplated resins may include resins curable by the action of ultraviolet light. In such instance, the resin is prepared as a mixture of monomers and/or oligomers, in combination with a photo initiator compound, and the coating solution is thereafter applied and cured by subsequent ultraviolet radiation.

Other resin coatings that are utilized in the preparation of laminates in accordance with the present invention, include a number of adhesive formulations that similarly vary depending upon the intended application of the laminate product. Thus, the properties of the adhesive composition will be selected depending upon whether the product is to be heat transferable, pressure transferable or both.

In accordance with a preferred embodiment of the present invention, a particular heat-transferable laminate may be prepared that utilizes a series of sequentially combined resin coats in combination with the chromium-containing metal coating of the present invention. The particular laminate and its sequence of preparation are set forth below.

Initially, a carrier film which may be a conventional polyester web, is coated with a release coat that itself, may be selected from materials well known for this purpose. In the present illustration, a wax release coating is utilized, and in particular, a solution of ouricury wax is gravure coated upon the carrier web. Subsequently, the wax coating is dried in a heated tunnel, leaving a uniform wax film on the carrier web.

Next, a top coat is applied to the release coat, also by a gravure coating technique. The top provides a tough, scuff-and stain- resistant upper surface for the final laminate product, that is particularly desirable when the laminate is used for automotive applications. The top coat is preferably a clear thermoplastic film prepared from one or more thermoplastic resins, including vinylpolymers, polyacrylic resins, polycarbonate resins, and the like. A preferred resin comprises polymethylmethacrylate. In the particular illustration the top coat is prepared from polymethylmethacrylate, to a minimum coating weight of 0.5 lbs per ream, based on dry resin, to assure proper release from the carrier film.

The exemplary laminate includes an intermediate coat disposed just below the top coat, that is also applied from a solution. The intermediate coat includes one or more resins curable by exposure to ultraviolet light, and offers the properties of solvent and abrasion resistance, and weathering. Accordingly, exposure of the laminate to organic solvents such as toluene, alcohol, gasoline and the like will not cause surface deterioration. The degree of abrasion resistance offered by the intermediate coat is dependent upon its thickness and accordingly a minimum coating weight of 3 lbs. per ream is required to attain desired resistance to abrasion.

Several ultraviolet light-curable resin systems may be used in the preparation of the intermediate coat. Exemplary materials are disclosed in the following U.S. Patents that are cited herein and incorporated by reference. U.S. Pat. Nos. 4,131,716 to Bertozzi; 4,131,602 to Hodakowski et al; 4,104,432 to Manabe et al; and 3,987,127 to Dickie et al.

The radiation curable materials may include a variety of acrylic polymers, including acrylic-substituted polyurethanes, epoxyacrylates, and similar materials. In accordance with the preferred example set forth herein, the intermediate coat may be prepared and applied as a solution of ultraviolet light-curable oligomers and monomers, an appropriate initiator compound, and one or more thermoplastic resins. Other conventional additives may be included. The particular materials utilized and their manner of preparation are known in the art, and reference is made to the above listed patents for purposes of illustration.

The intermediate coat may be dried and hardened by passing the thus coated carrier strip past a source of intense ultraviolet radiation, to facilitate the polymerization of the ultraviolet light-curable materials. The exact level of radiation may vary in accordance with specific resins utilized.

The exemplary laminate next receives the chromium-containing metal coating discussed in detail previously herein. The parameters of its application have likewise been specified, and reference is accordingly made to this earlier description. The present exemplary laminate desirably receives a transparently thin coating of metal, so that the specific conditions of vapor deposition outlined earlier may desirably be followed.

After the application of the chromium-containing metal coat is complete, a tie coat may be applied to the formed metal layer to provide suitable adhesive properties. The tie coat may be applied by similar gravure coating and drying techniques as discussed with respect to the top coat earlier. The tie coat may be prepared from thermoplastic vinyl polymers known in the art. Preferably, a carboxyl-modified vinyl resin is employed, and may be applied to a thickness that may vary up to 2 or 3 microns or greater. The exact thickness of the tie coat will depend upon the end use intended for the final laminate. The invention is not limited to a specific coating thickness.

A further pigmented coat may then be applied to lie below the tie coat in the final laminate product. The pigmented coat in this specific exemplary preparation is provided to offer opacity and color to the final laminate. Thus, the pigmented coat has a jet black pigment, that may be achieved by the inclusion in the coating formulation of conventional pigment materials such as carbon black and the like, alone or in combination with appropriate permanent dyes, all included in a solution in combination with known thermoplastic coating resins. The resins useful in the formulation of the pigmented coat includes the acrylic materials listed earlier. Other resin materials may also be included in variant formulations of this coating.

Like the tie coat, the pigmented coat may vary in thickness and may be comparable to that of the tie coat.

After the pigmented coat has been dried, a final adhesive or size coat may be applied to complete the preparation of the exemplary laminate product. The adhesive or size coat may vary in composition as noted earlier, and may include thermoplastic resins such as vinyl resins, acrylic resins, polyester resins and polyurethane resins, individually or suitable mixture. The exact formulation of the adhesive or size coat will vary with the ultimate end use of the laminate, and the invention is accordingly not limited to the selection and use of specific adhesive coat materials.

While the detailed method and associated laminate described above have utilized specific process techniques, such as gravure coating of the resin layers out of solution, and subsequent tunnel drying, it is to be understood that alternate means and techniques for the application of coatings in solution, such as dipping, spraying and the like, may be utilized. The employment of gravure coating techniques herein is disclosed for purposes of illustration and not by way of limitation.

The final laminate product may be utilized for a variety of decorative applications, and the post treatment of the product prepared as described above may accordingly vary. In particular the formed laminate may be retained on its carrier and indexed into position for a subsequent hot transfer application to a three dimensional product. Alternately, the laminate still residing on its carrier may be wound into a roll which may then be stored for later shipment or use. Yet further, the laminate may be removed or separated from the carrier which would then be available for reuse in the described method, with the formed laminate alone being wound up on a take up roll or the like. All of the foregoing post treatment procedures are known in the art, and further disclosure thereof is not believed necessary.

The laminates utilizing the metal coating of the present invention are particularly useful in outdoor applications where mechanical and other environmental adversities are encountered. The laminates are able to withstand the rigorous conditions of hot transfer operations, thermoforming operations and the adverse conditions of use.

Certain tests were conducted on laminates prepared in accordance with the present invention to determine their resistance to weathering. In particular, a laminate prepared in accordance with the preferred embodiment of the invention was transferred by a hot transfer technique to a substrate and was thereafter exposed to the action of ultraviolet light for an extended period of time in accordance with standard testing procedures. It was noted that adhesion of the laminate to the substrate and of the respective coats to each other remained unaffected after 1,000 hours of Q.U.V. exposure. Similarly, the product retained a minimum of 20% of its original abrasion resistance when tested after this time.

Additional tests were conducted with the present laminates to determine their resistance to water immersion. In similar fashion to the ultraviolet exposure tests discussed above, a product prepared by hot transfer of laminate to an appropriate substrate, was subsequently immersed in water maintained at a temperature of 70° F. After 96 hours of such immersion, the sample was tested for tape adhesion, by cross-hatching the surface and applying an adhesive tape thereto to determine the resistance of the laminate and its respective layers to de-lamination. Likewise, gloss, solvent resistance and abrasion resistance were all tested by recognized testing procedures, and the resulting product was observed to exhibit no loss with respect to tape adhesion, gloss, abrasion resistance, solvent or stain resistance.

It should be clear from the foregoing tests that the laminates prepared in accordance with the present invention may be successfully heat transfered to substrates with assurance that weatherability, abrasion resistance and other important properties will be favorably retained for extended periods of time. Also, the specific metalizing technique of the present invention results in the formation of a unique black mirror-like appearance that is superior to products shown in the prior art, both in appearance and durability.

A feature of the laminate described in detail earlier, comprises the application of the color or pigmented coat in a position so as to lie underneath the metal layer in the ultimate product. Prior art techniques that relied upon the application of a translucent color coat over the metallic layer, were deficient in initial appearance and weatherability, as the color coat tended to deteriorate rapidly, even in the instance where a subsequent outer coat was applied. By contrast, the thin almost transparent black chromium coating permits that the present laminate to take advantage of the deep black appearance of the underlying pigmented coat, while affording the pigmented coat greater protection from the adverse effects of environmental exposure.

This invention may be embodied in other forms or carried our in other ways without departing from the spirit or essential characteristics thereof. The present disclosure is therefore to be considered as in all respects illustrative and not restrictive, the scope of the invention being indicated by the appended claims, and all changes which come within the meaning and range of equivalency are intended to be embraced therein.

What is claimed is:

1. A decorative laminate offering a glossy black outer appearance of improved durability, comprising:

A. at least one base film;

B. a translucent, black reflective metal coating comprising a chromium-containing metal having a black appearance, applied over one surface of said base film, said coating formed by heating said metal to an elevated temperature above its boiling point and above the normal vaporization temperature of the metal, and vapor depositing said metal on said base film while maintaining said metal at said elevated temperature; and C. a top coat comprising a clear thermoplastic resin, applied over the free surface of said translucent metal coating.

2. The laminate of claim 1 wherein said base film is pigmented, a tie coat is present between said base film and said translucent metal coating, and an intermediate coat comprising an organic resinous coating material curable by ultraviolet light is present between said top coat and said translucent metal coating.

3. The laminate of claim 2 further including a heat-sensitive adhesive coating located on the free surface of said base film.

4. A coated article comprising at least one base film having a glossy black reflective metal coating thereon, said coating having improved durability and comprising a vapor deposited film of an intrinsically blackened chromium-containing metal formed by heating said metal prior to conducting the vapor deposition to a temperature above the boiling point of the metal and above the normal vaporization temperature of the metal, and maintaining said metal at said temperature throughout said vapor deposition.

5. The article of claim 4 wherein said metal film is prepared to a thickness offering a translucent visual appearance.

6. A decorative laminate product comprising at least one transferable resin film having bonded thereto the metal coating of claim 4.

7. The article of claim 4 wherein said chromium-containing metal is selected from the group consisting of nickel-chromium alloys, chromium-iron alloys, chromium-steel alloys, pure chromium, and mixtures thereof.

8. The article of claim 7 wherein said chromium-containing metal comprises a nickel-chromium alloy.

* * * * *